United States Patent Office 3,647,923
Patented Mar. 7, 1972

3,647,923
RESIN COMPOSITIONS CONTAINING
HINDERED PHENOLS
Stanley M. Hazen, Cheswick, and William J. Heilman,
Allison Park, Pa., assignors to Gulf Research & Development Company, Pittsburgh, Pa.
No Drawing. Filed July 15, 1968, Ser. No. 744,669
Int. Cl. C08f *3/02, 15/02, 15/04*
U.S. Cl. 260—878                       9 Claims

ABSTRACT OF THE DISCLOSURE

The shelf life of a liquid curable resin system is increased by the addition of a hindered phenol, such as 2,6-ditertiarybuylphenol or 2,6-ditertiarybutyl-p-cresol. The liquid curable resin system comprises a copolymer of maleic anhydride and an alpha-olefin such as hexene-1; a liquid unsaturated monoepoxide such as glycidyl acrylate or glycidyl methacrylate; and styrene. The system preferably contains less than 10 p.p.m. of water.

---

This invention relates to a method for increasing the shelf life of a liquid curable resin system containing certain solid polyanhydrides, certain liquid unsaturated monoepoxides and styrene. In particular this invention relates to the use of certain hindered phenols as inhibitors in increasing the shelf life of certain resins.

Of the many types of resinous compositions in the art, the epoxy resins obtained by crosslinking of polyepoxide compounds with various crosslinking agents have received a substantial amount of attention by those working in the art, as have resins prepared from reactants including dianhydrides and monomepoxide compounds. In many ultimate applications of resins, such as in coating, casting, potting, laminating, adhering objects together, encapsulating and filament winding, it is important that the materials have good curing properties and that the final products have the desired physical and chemical characteristics. It is also important from a commercial standpoint that the resin systems, if possible, be a one-package resin system, except for the addition of an accelerator or catalyst, if desired, so as to avoid the necessity of admixing two or more resin components by the user at the site where the resin is to be employed. It is, of course, of prime importance that the one-package resin system not set up, i.e. crosslink to form a gel or solid structure while on the shelf of the seller awaiting a buyer. The difficulty with most of the epoxy resin formulations on the market is their inability to form a one-package system, except for a catalyst, with a commercially acceptable shelf life. By a commercially acceptable shelf life is meant that the resin system will be maintained in a fluid non-gel condition in an unopened package for a time of at least ninety days.

It is one of the objects of this invention to provide a one-package epoxy resin composition having excellent shelf life characteristics.

In accordance with the invention, an epoxy resin composition is provided having an improved shelf life which comprises a liquid solution of:

A copolymer of maleic anhydride and an alpha-olefin having between 3 and 20 carbon atoms per molecule:

A liquid unsaturated monoepoxide selected from the group consisting of glycidyl acrylate and glycidyl methacrylate, the amount of said liquid monoepoxide being such that the anhydride to epoxide equivalent ratio is between 0.25 and 2.0;

Styrene, the amount of said styrene being between 20 and 70 weight percent of said liquid solution;

And between 0.01 and 2.0 weight percent of said liquid solution of a hindered phenol having a tertiary butyl group directly attached to each of the ring carbon atoms adjacent the phenolic hydroxyl group.

The copolymer of the alpha-olefin and maleic anhydride is a solid polyanhydride prepared by copolymerizing maleic anhydride with an alpha-olefin represented by the general formula below:

FORMULA I

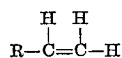

where R is an alkyl radical having from one to about 18 carbon atoms, more preferably from four to 18 carbon atoms.

It is understood that the term "olefin" is meant to include mixtures of monoolefins such as those obtained by the thermal or catalytic cracking of petroleum stocks. While only one olefinic bond per molecule is present in the olefin, since more than one double bond per molecule promotes gel formation and internal cross-linking, minor, amounts of diolefins, of the order of two percent or less, can be tolerated.

Examples of olefin compound or mixtures of olefins suitable to form the solid polyanhydride components of the compositions of this invention include:

| | |
|---|---|
| 1-propene; | 1-decene; |
| 1-butene; | 1-undecene; |
| 1-hexene; | 1-dodecene; |
| 1-pentene; | 1-tridecene; |
| 1-heptene; | 1-tetradecene; |
| 1-octene; | 1-nonadecene; |
| 1-nonene; | | and mixtures thereof.

One possible structure of the copolymer of hexene-1 and maleic anhydride is as follows:

FORMULA II

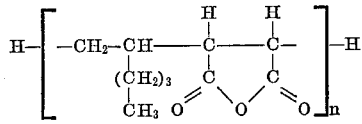

wherein $n$ is from 2 to about 100, or higher, and preferably from 2 to about 30. The foregoing assumes no additional polymerization of like monomers, which of course can take place with suitable monomers and conditions. It is to be understood that either or both of the terminal groups in the foregoing formula may be derived from any components in the reaction mixture.

A more general empirical formula is as follows:

FORMULA III

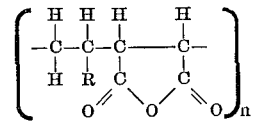

wherein $n$ is an integer of from 2 to about 100 and R is as defined above.

The copolymerization can be conducted in any suitable manner. One suitable copolymerization procedure involves contacting the olefinic compound with the maleic anhydride in a suitable solvent in the presence of a free radical producing catalyst, such as a peroxide. The molar ratio of the mono-α-olefin to maleic anhydride is desirably between about 1:1 and 3:1.

The temperature at which the copolymerization occurs is not critical and can generally vary between about 25° and 100° C. with a preferred reaction temperature between about 65° and 85° C. The lower limit on reaction temperature is determined by the temperature required to decompose the catalyst into free radicals. Thus, the lower reaction temperature will depend to a large extent on the catalyst employed. However, most free radical producing catalysts, such as the peroxides and others described below, are effective at temperatures as low as 25° C. unless a promoter, such as a ferrous, silver, sulfate or thiosulfate ion, is used, in which case much lower temperatures, i.e., −80° C., can be employed. The upper reaction temperature is determined by the boiling point of the components of the reaction mixture and the predominance of unwanted side reaction.

The reaction pressure should be sufficient to maintain the solvent in the liquid phase. Increased pressure, however, in addition to being an added expense, also promotes unwanted side reactions, such as polymerization of the olefinic compound. Pressures can therefore vary between about atmospheric and 100 p.s.i.g., or higher, but the preferred pressure is atmospheric.

The copolymers can be produced in any suitable solvent which at least partially dissolves both of the reaction components. Suitable solvents include, for example:

n-pentane;
n-hexane;
n-octane;
toluene;
benzene;
cumene;
xylene;
anisol;
acetone;
tetrahydrofuran;
cyclohexane;
n-propylacetate;
ethylbenzene;

di-n-butylether;
n-amylacetate;
cyclohexanone;
bromobenzene;
methylene chloride;
diisopropyl ether;
carbon tetrachloride;
methylcyclohexane;
ethyl-n-butyrate;
tetrachloroethylene;
methylorthotolylether;
methylethylketone; and
ethylbenzylether.

The catalyst to employ can be any free radical producing material well known in the art. Preferred catalysts are the organic peroxides, such as benzoyl, lauroyl and tertiary butyl peroxide. Other suitable free radical producing materials include substituted azo compounds, such as alpha-alpha-azobisisobutyronitrile.

The molecular weight of the polyanhydride component of the compositions of this invention is not critical. The inherent viscosity (which is a measure of molecular weight) of five grams of the polyanhydride per deciliter of acetone at 77° F. is suitably between about 0.04 and 3.0.

The composition of this invention also comprises an unsaturated monooxirane compound selected from the group consisting of glycidyl methacrylate and glycidyl acrylate. These unsaturated monoepoxides can be represented by the general Formula II below:

FORMULA II

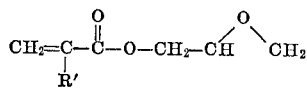

where R' is hydrogen or methyl.

The composition of this invention also comprises styrene which is used in an amount between 20 and 70 weight percent based on the total of polyanhydride, monoepoxide and styrene. The styrene unexpectedly and in some unknown manner interacts with the polyanhydride and unsaturated monoepoxide to form an infusible crosslinked thermoset resin on curing rather than homopolymerizing as a separate phase reaction. The styrene also serves to dilute the resin composition, rendering it more fluid and more easily processable. The styrene because of its diluent characteristics also enables the use of higher anhydride to epoxide equivalent ratios if desired. The preferred amounts of styrene to employ are between 40 and 65 weight percent of the resinous components, and by resin components is meant the polyanhydride, the monoepoxide and the styrene. Amounts of styrene less than 20 weight percent are not desired because the shelf life of the system decreases as the styrene content is reduced and is too short at styrene contents of about 20 percent or less. Amounts of styrene greater than 70 weight percent are not recommended because the physical properties of the resulting resin are less than would be desired.

The compositions of this invention are liquid curable compositions and can be admixed in any suitable manner. For example, the solid polyanhydride can be added initially to either the monoepoxide or the styrene or a mixture of the liquid monoepoxide and liquid styrene at temperatures of about room temperature. It is preferred to add the solid polyanhydride in finely divided form, i.e. powdered form, to the liquid monoepoxide and/or styrene. It is more preferred to admix the polyanhydride either with the styrene or with a mixture of the styrene and monoepoxide since the styrene serves as a diluent for the more viscous monoepoxide and aids in dissolving the polyanhydride in the monoepoxide, especially when the anhydride to epoxide equivalent ratio is above about 0.7. A solution is required in order to obtain a hard infusible resin which is non-grainy and has excellent chemical resistance properties together with good flexural strength. The time for solution of the polyanhydride in the monoepoxide and/or styrene varies depending on the ratio of the materials in the mixture, the temperature, the particle size of the polyanhydride and, of course, the nature of the materials themselves. Thus, while the anhydride to epoxide equivalent ratio (A/E ratio) in the final mixture can vary between 0.25 to 2.0 and is preferably between 0.4 and 1.8, faster solution of the polyanhydride will occur at the lower A/E ratios and in the less viscous system where the styrene is initially added. In addition, it is sometimes desirable to heat the monoepoxide and/or styrene to effect a faster solution of the polyanhydride; however, the use of increased temperatures promotes cross-linking and solidification, and thus the temperatures during premixing are suitably maintained below about 90° and are preferably between 10° and 60° C. The solutions are, of course, liquid solutions at room temperature.

Because of the reactive nature of the components, they tend to react on standing to form a gel and eventually a hard infusible resinous structure even when an extraneous catalytic material, such as a peroxide, is not present.

It has been found that certain hindered phenols can be successfully employed in the above defined compositions to increase the shelf life of these compositions to commercially acceptable lengths of time. These hindered phenols can be any phenol having a tertiary butyl group directly attached to each of the ring carbon atoms adjacent the phenolic hydroxy group. Preferably the hindered phenols consist essentially of carbon, hydrogen and oxygen where the oxygen is a part of the phenolic hydroxyl group. The hindered phenol should, of course, not contain functional groups which would react with the resin components or catalyze the anhydride-epoxide reaction. Examples of unwanted functional groups include —SH; —NH$_2$; —OH (unhindered) and

The more preferred phenols can be represented by the Formula III below:

FORMULA III

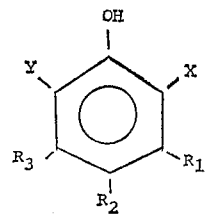

where X and Y are tertiarybutyl groups and $R_1$, $R_2$ and $R_3$ can be the same or different and are selected from hydrogen; hydrocarbon radicals having between one and 15 carbon atoms, especially alkyl groups having one to ten carbon atoms; halogen; $-NO_2$; $-OR''$ where $R''$ is any hydrocarbon radical;

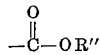

where $R''$ is as defined;

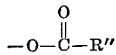

where $R''$ is as defined; and $-C\equiv N$.

Suitable hindered phenols include but are not limited to:

2,6-ditertiarybutylphenol;
2,6-ditertiarybutylparacresol;
2,4,6-tritertiarybutylphenol;
2,6-ditertiarybutylmetacresol;
2,6-ditertiarybutyl-4-decylphenol;
2,6-ditertiarybutyl-3-chlorophenol;
2,6-ditertiarybutyl-5-bromophenol;
2,6-ditertiarybutyl-4-fluorophenol;
2,6-ditertiarybutyl-4-nitrophenol;
2,6-ditertiarybutyl-4-paramethoxyphenol
2,6-ditertiarybutyl-4-parabutoxyphenol
3,5-ditertiarybutyl-4-hydroxyanisol
3,5-ditertiarybutyl-4-hydroxypropylketone
3,5-ditertiarybutyl-4-hydroxyacetate
2,4-ditertiarybutyl-3-hydroxyoctanoate.

The phenols of this invention are commercially available materials and can be prepared, for example, by the methods disclosed in U.S. Pat. 2,603,662.

The amount of the hindered phenol to employ in the compositions of this invention can vary between 0.01 and 2.0 weight percent of the liquid solution, with preferred amounts of the hindered phenol between 0.05 and 1.0 weight percent. Amounts less than 0.01 weight percent are in general not desired as the concentration is too low to be effective while concentrations above 2.0 weight percent give no additional benefits and become economically undesirable.

The invention will be further described with reference to the following experimental work.

In the first set of experiments, a liquid resinous composition was prepared containing a hexene-1-maleic anhydride copolymer, glycidyl methacrylate and styrene. The amounts of the copolymer and glycidyl methacrylate were such that the anhydride to epoxide equivalent ratio was 1.5. The hexene-1-maleic anhydride copolymer was prepared by reacting hexene-1 and maleic anhydride in a molar ratio of 2:1 in the liquid phase in the presence of a mutual solvent at a temperature between 60° C. and 100° C. using as a catalyst between one and three weight percent of benzoyl peroxide based on the maleic anhydride. The copolymer was then (1) separated from the solvent and any residual catalyst and (2) dried. Infrared analysis and nuclear magnetic resonance data show the olefin and maleic anhydride to have combined in a 1:1 molar ratio. The inherent viscosities of the copolymers measured as described above was between 0.074 and 0.094. The analysis of the final liquid solution was 12.1 weight percent hexene-1; 14.2 weight percent maleic anhydride; 13.7 weight percent glycidyl methacrylate and 60 weight percent styrene. It was found that the styrene and glycidyl methacrylate as received contained small amounts of water and for some of the experiments both of these components were dried, the glycidyl methacrylate by passage through a column of molecular sieves and the styrene by distillation to reduce the water content of the final compositions. When the glycidyl methacrylate and styrene were used as received, the water content of the liquid curable resin system was about 90 parts per million (p.p.m.).

By the liquid curable resin system is meant the solution of the polyanhydride in the monoepoxide and styrene. When the glycidyl methacrylate and styrene were dried as above before forming the liquid curable resin system, the water content was reduced to about 5 p.p.m. Various inhibitors were then added in concentrations of 0.1; 0.5 and 1.0 weight percent concentrations based on the total liquid curable resin system and aliquot portions of the various liquid resin compositions were placed into sealed jars or cans to determine the length of time required (i.e., shelf life) for the liquid curable resin to react to form a non-flowing gel without the aid of a catalyst. The samples were stored at room temperature. A summary of the results of this series of experiments is given in Table I below.

TABLE I

| Example number: | P.p.m. water in total resin | Inhibitor | Inhibitor, weight percent | Time to set to a non-flowing gel at 25° C., days |
|---|---|---|---|---|
| 1 | ca. 90 | None | None | 7 |
| 2 | ca. 5 | None | None | 7 |
| 3 | ca. 90 | (¹) | 0.1 | 174 |
| 4 | ca. 5 | (¹) | 0.1 | 244 |
| 5 | ca. 5 | (¹) | 0.5 | +400 |
| 6 | ca. 5 | (¹) | 1.0 | +400 |
| 7 | ca. 5 | (²) | 0.1 | 304 |
| 8 | ca. 5 | (²) | 0.5 | +400 |
| 9 | ca. 5 | (²) | 1.0 | +400 |
| 10 | ca. 5 | (³) | 0.1 | 206 |
| 11 | ca. 5 | (³) | 0.5 | 304 |
| 12 | ca. 5 | (³) | 1.0 | 304 |

¹ 2,6-ditertiarybutylphenol.
² 2,6-ditertiarybutyl-p-cresol.
³ 2,4,6-triteritarybutylphenol.

Referring to Table I, Examples 1 and 2 show that when no inhibitor is employed the liquid curable resin system forms a non-flowing gel in about a week regardless of whether the liquid glycidyl methacrylate and styrene are predried before forming the liquid curable resin system. Examples 3 and 4 show that the addition of 0.1 weight percent 2,6-ditertiarybutylphenol greatly increases the time before a gel structure is formed, especially is this true when the glycidyl methacrylate and styrene components are dried before forming the liquid curable resin composition. Thus, in Example 4 a gel structure was not formed for 244 days utilizing the dry components compared to 174 days when the system contained about 90 p.p.m. of water. In Experiments 5 and 6 increased amounts of 2,6-ditertiarybutylphenol were employed and gel times in excess of 400 days were achieved.

Experiments 7 through 9 show substantially the same results as experiments 4–6 except 2,6-ditertiarybutyl-p-cresol was employed as the inhibitor. A comparison of Examples 4 and 7 shows that better results were obtained with the p-cresol inhibitor, i.e. 304 days compared to 244 days for Example 4.

Examples 10–12 can be compared with Examples 4–6 and 7–9 to show that yet another hindered phenol, i.e. 2,4,6-tritertiarybutylphenol is useful as an inhibitor in the compositions of this invention.

EXAMPLE 13

Example 3 was reported except the liquid resin composition was stored in a sealed ordinary tin coated steel can. The time for the composition to set to a non-flowing gel (shelf life) at about 25° C. was increased from 174 days to about 330 days.

EXAMPLE 14

Example 4 was repeated except the liquid resin composition was stored in a sealed ordinary tin coated steel can and the time to set to a non-flowing gel at about room temperature was increased from 244 days to about 360 days (one year).

EXAMPLE 15

Example 14 was repeated except the amount of the 2,6-ditertiarybutylphenol was decreased to 0.05 weight percent. The time to set to a non-flowing gel was correspondingly decreased from 360 days (one year) to 195 days.

EXAMPLE 16

Example 7 was repeated except the liquid resin composition was stored in a sealed ordinary tin coated steel can and the time for the liquid resin composition to set to a non-flowing gel at about room temperature was increased from 304 days to about 315 days.

EXAMPLE 17

Example 16 was repeated except the liquid resin composition contained about 90 p.p.m. of water and the time for the composition to set to a non-flowing gel was about 285 days.

EXAMPLE 18

Example 18 was repeated except the liquid resin contained about 90 p.p.m. of water. The time for the liquid composition to set to a non-flowing gel was about 285 days.

EXAMPLE 19

Example 18 was repeated except the liquid resin contained about 90 p.p.m. of water. The time for the liquid composition to set to a non-flowing gel was about 285 days.

A comparison of Examples 13–19 with Examples 3, 4, 7 and 10 shows that storage in sealed metal containers is generally superior to storage in glass except for the case of 2,6-ditertiarybutyl-p-cresol where the difference is small. A comparison of Examples shows that it is preferred to maintain the water level in the liquid resin composition as low as possible during storage. The amount of water that can be tolerated in the resin system can suitably be as much as 200 p.p.m. of water but is preferably less than 100 p.p.m. and most preferably less than 10 p.p.m.

A second series of runs was made utilizing the same composition as above except the A/E ratio was decreased to 0.5 and the amount of sytrene was reduced in half. The final composition had the following analysis: 12.0 weight percent hexene-1; 14.0 weight percent maleic anhydride; 40.6 weight percent glycidyl methacrylate and 33.3 weight percent styrene. The hexene-1 and maleic anhydride were, of course, reacted first and used as the copolymer. Samples of the above composition contained either about 5 or about 90 p.p.m. of water and 0.1 weight percent of either 2,6-ditertiarybutylphenol, 2,6-ditertiarylbutyl-p-cresol or 2,4,6-tritertiarybutylphenol and were stored in sealed glass jars at about room temperature to determine the time for the liquid compositions to form a non-flowing gel. The results of this series of runs are given in Table II below:

TABLE II

| Example number: | P.p.m. water in total resin | Inhibitor | Inhibitor, weight percent | Time to set to a non-flowing gel at 25° C., days |
|---|---|---|---|---|
| 20 | ca. 5 | (¹) | 0.1 | 126 |
| 21 | ca. 90 | (¹) | 0.1 | 91 |
| 22 | ca. 5 | (²) | 0.1 | 126 |
| 23 | ca. 90 | (²) | 0.1 | 91 |
| 24 | ca. 5 | (³) | 0.1 | 126 |
| 25 | ca. 90 | (³) | 0.1 | 91 |

NOTE.—See footnotes at bottom Table I.

Referring to Table II, each of the inhibitors appear to give about the same results whether in a substantially dry (about 5 p.p.m.) system or as a received system containing about 90 p.p.m. of water. A comparison of the results in Table II with those in Table I shows that as the amount of sytrene in the total system is reduced, the time for the resin system to form a non-flowing gel is also reduced. Thus, the best system for marketing a one-package resin system which will not set up over a reasonable length of time is a system containing the larger amounts of styrene, i.e. preferably between 40 and 65 weight percent styrene; a system wherein the liquid components are dried before admixture; and a system wherein the resin is stored in a metallic container.

It is not known for sure why the phenolic materials defined above function so well to increase the shelf or pot life of the defined liquid curable resin compositions. It is known that the gel structure is formed through some interaction of the anhydride groups of the polyanhydride with the epoxide group of the glycidyl methacrylate or acrylate or with some interaction of the styrene with the glycidyl acrylate or methacrylate. It was expected that many materials known in the art as inhibitors for styrene or acrylate polymerization would function satisfactorily in the compositions of this invention. However, a large number of materials with known inhibitory properties were tried but were found unsuccessful in the compositions of this invention to appreciably increase the shelf life. A number of these unsuccessful materials which were employed include: tertiarybutylcatechol; hydroquinone; benzoquinone; chloranil; nitrobenzene; phenyldisulfide; bis(dimethylthiocarbamyl)disulfide; trilauryltrithiophosphite; 2-methylmercaptobenzimidazole; dilaurylthiodipropionate; distearylthiodipropionate; di-n-dodecylsulfide; thiosemicarbazide; acetonesemicarbazone; and semicarbazide base.

Resort may be had to such variations and modifications as fall within the spirit of the invention and the scope of the appended claims.

We claim:
1. A composition of matter which consisting essentially of a liquid solution of:
   a copolymer of maleic anhydride and an alpha-olefin having between 3 and 20 carbon atoms per molecule, where in said copolymer the molar ratio of alpha-olefin to maleic anhydride is from about 1:1 to 3:1;
   a liquid unsaturated monoepoxide selected from the group consisting of glycidyl acrylate and glycidyl methacrylate, the amount of said liquid monoepoxide being such that the anhydride to epoxide equivalent ratio is between 0.25 and 2.0;
   styrene, the amount of said styrene being between 20 and 70 weight percent of said liquid solution;
   and between 0.01 and 2.0 weight percent of said liquid solution of a hindered phenol having the formula:

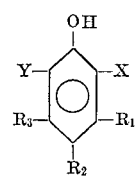

where X and Y are tertiary butyl groups and $R_1$, $R_2$ and $R_3$ can be the same or different and are selected from the group consisting of hydrogen; saturated hydrocarbon radicals having from 1 to 15 carbon atoms; halogen; —NO₂; —OR″ where R″ is any saturated hydrocarbon radical;

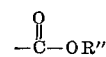

where R″ is as defined;

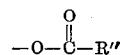

where R″ is as defined; and —C≡N.

2. A composition according to claim 1 wherein the hindered phenol consists of carbon, hydrogen and oxygen, where the oxygen is a part of the phenolic hydroxyl group.

3. A composition according to claim 1 wherein the hindered phenol is 2,6-ditertiarybutylphenol.

4. A composition according to claim 1 wherein the hindered phenol is 2,6-ditertiarybutyl-p-cresol.

5. A composition according to claim 1 wherein the hindered phenol is 2,4,6-tritertiarybutylphenol.

6. A composition according to claim 2 wherein the liquid unsaturated monoepoxide is glycidyl methacrylate.

7. A composition according to claim 6 wherein the alpha-olefin is hexene-1.

8. A composition according to claim 7 wherein the amount of the styrene is between 40 and 65 weight percent and the amount of the hindered phenol is between 0.05 and 1.0 weight percent.

9. A composition according to claim 1 wherein $R_1$, $R_2$ and $R_3$ can be the same or different and are selected from hydrogen; saturated alkyl groups having from 1 to 10 carbon atoms and halogen.

References Cited

UNITED STATES PATENTS

| | | | |
|---|---|---|---|
| 2,603,662 | 7/1952 | Stevens | 260—624 |
| 3,252,934 | 5/1966 | Jankens | 260—33.4 |
| 3,310,509 | 3/1967 | Fukumoto et al. | 260—23 |
| 3,441,543 | 4/1969 | Heilman | 260—778.5 |
| 3,349,072 | 10/1967 | Alexander et al. | 260—94.9 |
| 3,441,543 | 4/1969 | Heilman | 260—78.5 |

OTHER REFERENCES

Kirk-Othmer: Encyclopedia of Chemical Technology, 2nd Edition, Vol. 2, pp. 588–604. New York; Interscience (1963).

Encyclopedia of Polymer Science and Technology, Vol. 2, pp. 171–197. New York, Interscience (1965).

HARRY WONG, Jr., Primary Examiner

U.S. Cl. X.R.

117—161; 161—247

PO-1050
(5/69)

UNITED STATES PATENT OFFICE
CERTIFICATE OF CORRECTION

Patent No. 3,647,923          Dated March 7, 1972

Inventor(s) Stanley M. Hazen and William J. Heilman

It is certified that error appears in the above-identified patent and that said Letters Patent are hereby corrected as shown below:

Col. 1, line 34, "monomepoxide" should be --monoepoxide--;

Col. 2, line 20, delete comma after "minor";

Col. 3, line 42, "alpha-alpha-azobisisobutyronitrile" should be --alpha-alpha'-azobisisobutyronitrile--;

Col. 6, line 60, "reported" should be --repeated--;

Col. 7, lines 17-20, Example 18 should read as follows:

EXAMPLE 18

"Example 10 was repeated except the liquid resin was stored in a sealed ordinary tin coated steel can and the time to set to a non-flowing gel at about 25°C. was increased from 206 days to about 315 days."

Signed and sealed this 8th day of August 1972.

(SEAL)
Attest:

EDWARD M. FLETCHER, JR.      ROBERT GOTTSCHALK
Attesting Officer              Commissioner of Patents